United States Patent
Ma et al.

(10) Patent No.: US 10,904,369 B2
(45) Date of Patent: Jan. 26, 2021

(54) BATTERY COVER AND ELECTRONIC DEVICE

(71) Applicant: Huawei Technologies Co., Ltd., Shenzhen (CN)

(72) Inventors: Dong Ma, Beijing (CN); Wenping Guo, Shenzhen (CN); Jinhai Guo, Shenzhen (CN); Kuibing Zhao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 50 days.

(21) Appl. No.: 16/316,242

(22) PCT Filed: Jul. 8, 2016

(86) PCT No.: PCT/CN2016/089485
§ 371 (c)(1),
(2) Date: Jan. 8, 2019

(87) PCT Pub. No.: WO2018/006427
PCT Pub. Date: Jan. 11, 2018

(65) Prior Publication Data
US 2019/0253539 A1    Aug. 15, 2019

(51) Int. Cl.
*H04M 1/02*    (2006.01)

(52) U.S. Cl.
CPC ....... *H04M 1/0262* (2013.01); *H04M 1/0264* (2013.01); *H04M 1/0277* (2013.01); *H04M 2250/12* (2013.01)

(58) Field of Classification Search
CPC ............. H04M 1/0262; H04M 1/0264; H04M 1/0277; H04N 5/2254; H04N 5/2253; H04N 5/2257
See application file for complete search history.

(56) References Cited

U.S. PATENT DOCUMENTS 9,232,031 B1*   1/2016   Shoval ................... H01Q 1/242
2007/0285555 A1   12/2007   Chen
(Continued)

FOREIGN PATENT DOCUMENTS

CN   102804942 A   11/2012
CN   202889484 U    4/2013
(Continued)

OTHER PUBLICATIONS

Foreign Communication From a Counterpart Application, European Application No. 16907931.6, Extended European Search Report dated Mar. 13, 2019, 7 pages.
(Continued)

*Primary Examiner* — Nicholas G Giles

(74) *Attorney, Agent, or Firm* — Conley Rose, P.C.

(57) ABSTRACT

A battery cover is applied to the electronic device and configured to couple to a housing of the electronic device, and includes a glass substrate. A non-transparent layer is disposed on a first side of the glass substrate. At least one first through-hole is disposed on the non-transparent layer opposite to a camera assembly disposed in the electronic device. A camera region is disposed on the first side of the glass substrate disposed opposite to the at least one first through-hole. A film-coated layer is disposed in the camera region of the glass substrate. An area of the camera region is greater than or equal to an area of the at least one first through-hole.

20 Claims, 6 Drawing Sheets

(56) References Cited

U.S. PATENT DOCUMENTS

| | | |
|---|---|---|
| 2012/0329531 A1 | 12/2012 | Park et al. |
| 2013/0177302 A1 | 7/2013 | Weber et al. |
| 2015/0296635 A1 | 10/2015 | Mycroft et al. |

FOREIGN PATENT DOCUMENTS

| | | |
|---|---|---|
| CN | 204103980 U | 1/2015 |
| CN | 204231451 U | 3/2015 |
| CN | 104751131 A | 7/2015 |
| CN | 104795632 A | 7/2015 |
| CN | 204779343 U | 11/2015 |
| CN | 205051741 U | 2/2016 |
| CN | 205355245 U | 6/2016 |
| EP | 2328330 A1 | 6/2011 |

OTHER PUBLICATIONS

Machine Translation and Abstract of Chinese Publication No. CN104751131, Jul. 1, 2015, 15 pages.
Machine Translation and Abstract of Chinese Publication No. CN202889484, Apr. 17, 2013, 8 pages.
Foreign Communication From a Counterpart Application, Chinese Application No. 201680037426.1, Chinese Office Action dated Apr. 23, 2019, 10 pages.
Machine Translation and Abstract of Chinese Publication No. CN104795632, Jul. 22, 2015, 8 pages.
Machine Translation and Abstract of Chinese Publication No. CN204103980, Jan. 14, 2015, 6 pages.
Machine Translation and Abstract of Chinese Publication No. CN204231451, Mar. 25, 2015, 8 pages.
Machine Translation and Abstract of Chinese Publication No. CN204779343, Nov. 18, 2015, 5 pages.
Machine Translation and Abstract of Chinese Publication No. CN205051741, Feb. 24, 2016, 5 pages.
Machine Translation and Abstract of Chinese Publication No. CN205355245, Jun. 29, 2016, 6 pages.
Foreign Communication From a Counterpart Application, PCT Application No. PCT/CN2016/089485, English Translation of International Search Report dated Apr. 13, 2017, 4 pages.
Foreign Communication From a Counterpart Application, PCT Application No. PCT/CN2016/089485, English Translation of Written Opinion dated Apr. 13, 2017, 4 pages.

* cited by examiner

BATTERY COVER AND ELECTRONIC DEVICE

CROSS-REFERENCE TO RELATED APPLICATIONS

This application is a U.S. National Stage of International Patent Application No. PCT/CN2016/089485 filed on Jul. 8, 2016, which is hereby incorporated by reference in its entirety.

TECHNICAL FIELD

Embodiments of the present invention relate to the field of electronic devices, and in particular, to a battery cover and an electronic device.

BACKGROUND

With development of science and technology, terminals (such as a mobile phone and a tablet computer) become increasingly popular, and become indispensable tools in modern life of people. As an indispensable part in the terminal, a battery cover is usually configured to fit a housing of the terminal in a buckling manner, and wrap a battery of the terminal and an internal component (for example, a camera and a flash assembly) of the terminal in the terminal. In a current market, most battery covers of the terminals are made of glass materials.

A battery cover is provided in the prior art. As shown in FIG. 1A, the battery cover 10 includes a glass substrate 101, and a camera through-hole 102 for forming a camera region is disposed at a location that is on the glass substrate 101 and that is opposite to a terminal camera. As shown in FIG. 1B, the camera region includes: a camera lens 104 for protecting a terminal camera 20 and improving optical performance of the camera, and a camera decorating part 103 for supporting the camera lens 104. The camera lens 104 is built in the camera decorating part 103. To reduce a gap between the camera lens 104 and the camera through-hole 102, the camera decorating part 103 is usually fastened in the camera through-hole 102 in a double-sided adhesive pasting manner, a glue dispensing manner, or a point soldering manner.

When the battery cover is being manufactured, if a painted adhesive or a dispensed glue is relatively thin or the camera decorating part 103 is not evenly pasted, a gap between the camera lens 104 and the battery cover 10 may be caused, and consequently, dust or liquid easily enters the terminal and pollutes the terminal camera 20. In addition, because of limitations of a camera height and an overall thickness, to implement a photographing standard of the camera 20, the camera lens 104 should be disposed outside the camera, and the camera lens 104 needs to meet a flatness requirement to avoid deformation of a photographed image and meet a specific transmittance requirement to avoid distortion of the photographed image, and should further have scratch resistance performance and the like. In addition, as the terminal becomes increasingly thin, the camera lens 104 and the camera decorating part 103 of the camera lens 104 both protrude from the battery cover. As a result, the camera lens 104 is inevitably frayed or scratched in a user use process. Additionally, because the camera decorating part 103 is fastened on the battery cover IC) only in the adhesive pasting manner, the glue dispensing manner, or the point soldering manner, chronic friction reduces drawing force of the camera decorating part 103, and consequently, the camera decorating part 103 and the camera lens 104 are detached. In addition, when the battery cover is manufactured, the camera decorating part 103 and the camera lens 104 are separately produced, thereby increasing operations and processing costs.

SUMMARY

Embodiments of the present invention provide a battery cover and an electronic device, to resolve at least a problem that liquid or dust enters the electronic device through a camera through-hole.

According to a first aspect, an embodiment of the present invention provides a battery cover, and the battery cover is applied to an electronic device and configured to connect a housing of the electronic device, and includes a glass substrate, where a non-transparent layer is disposed on a first side of the glass substrate; at least one first through-hole is disposed on the non-transparent layer, and the first through-hole is disposed opposite to a camera assembly disposed in the electronic device; and a camera region is disposed on the first side of the glass substrate, the camera region is disposed opposite to the at least one first through-hole, a film-coated layer for increasing light transmittance is disposed in the camera region of the glass substrate, and an area of the camera region is greater than or equal to an area of the first through-hole.

In the foregoing solution in this embodiment of the present invention, to improve a photographing effect of the camera assembly, in this embodiment of the present invention, the first through-hole is disposed on only the non-transparent layer, and no through-hole opposite to the camera assembly needs to be disposed on the glass substrate. Therefore, when the battery cover is applied to the electronic device, dust or liquid can be effectively prevented from entering the electronic device. In addition, because flatness of the camera region of the glass substrate in the foregoing solution can meet a preset flatness requirement, an image photographed by the camera assembly can be prevented from being deformed, in addition, the film-coated layer is disposed in the camera region of the glass substrate. Because the film-coated layer can meet a light transmittance requirement, the battery cover provided in this embodiment of the present invention can meet the transmittance requirement and the preset flatness requirement without using a camera lens, so as to reduce an overall assembly operation and improve assembly efficiency. In addition, because no through-hole for installing the camera lens needs to be disposed on the glass substrate, overall strength of the battery cover is improved.

Optionally, the non-transparent layer includes a glare plate or an ink layer that is printed on the first side of the glass substrate by using silk screen, so as to enhance an effect of the glass substrate and improve appearance gorgeousness of the battery cover.

Optionally, a second through-hole is disposed on the non-transparent layer, and the second through-hole is disposed opposite to a flash assembly of the electronic device; and a through-hole is disposed, opposite to the second through-hole, on the glass substrate. Because the glass substrate has a light guide function, when the flash assembly emits light, light crosstalk easily appears when the light passes through the glass substrate. Therefore, the second through-hole and a through-hole opposite to the second through-hole may be disposed to avoid the light crosstalk.

Optionally, a third through-hole is disposed on the non-transparent layer, and the third through-hole is disposed opposite to a flash assembly of the electronic device; and a flash region is disposed on the first side of the glass substrate, the flash region is disposed opposite to the third through-hole, a second film-coated layer is disposed in the flash region, and an area of the flash region is greater than or equal to an area of the third through-hole. The second film-coated layer is disposed in the flash region, and the area of the flash region is greater than or equal to the area of the third through-hole. Therefore, light crosstalk of the flash assembly is avoided. In addition, the third through-hole is disposed on only the non-transparent layer, thereby improving the overall strength of the battery cover.

Optionally, at least one camera black ring is printed on the first side or a second side of the glass substrate by using silk screen, and the camera black ring is disposed opposite to the first through-hole, so as to resolve a problem of a residual adhesive and a cut serration that are generated because the first through-hole is disposed on the non-transparent layer.

Optionally, an inner diameter of the camera black ring is less than or equal to a diameter of the first through-hole disposed opposite to the camera black ring.

Optionally at least one identification part is disposed on the first side or the second side of the glass substrate. The identification part is used to mark a location of a component installed inside the electronic device or a signal collection range of the component. In this way, the identification part is disposed, so that the user can accurately learn an installation location of the component and can easily install the battery cover when connecting the battery cover to the housing.

Optionally, when the component is a collection apparatus configured to collect a user vital sign parameter, the first side or the second side of the glass substrate includes: a first identification part, used to mark a range in which the collection apparatus collects a user vital sign signal; and a fourth through-hole is disposed on the non-transparent layer, and the fourth through-hole is disposed opposite to the first identification part, and is configured to enable the collection apparatus to be in contact with the first side of the glass substrate through the fourth through-hole.

Optionally, the film-coated layer is an anti-reflection coating; and the anti-reflection coating is disposed to improve light transmittance.

Optionally, a second film-coated layer for repelling a fingerprint and an oil stain is disposed on the second side of the glass substrate. The second film-coated layer uses an AF (anti-fingerprint, anti-fingerprint) coated film, so as to effectively repel the fingerprint and easily wipe a generated smudge from the battery cover.

According to a second aspect, an embodiment of the present invention provides an electronic device, where the electronic device includes a housing, a printed circuit board PCB board disposed in the housing, and the battery cover provided in any one of the first aspect or possible implementations of the first aspect, and the battery cover is connected to the housing; a camera assembly connected to the PCB board is disposed in the housing; and when the battery cover is connected to the housing, the camera assembly is disposed opposite to a camera region on the battery cover, and a non-transparent layer of the battery cover is adjacent to the PCB board.

Optionally, the electronic device further includes a flash assembly, connected to the PCB board, where a flash protective cover is further disposed on the battery cover, and when the battery cover is connected to the housing, the flash assembly may be built in an accommodation cavity of the flash protective cover.

Optionally, the electronic device further includes an auxiliary focus apparatus, disposed on the PCB board and configured to measure and identify a distance to a photographed object, so as to implement rapid focus of the camera assembly, where a first side or a second side of the glass substrate includes a second identification part, where the second identification part is used to mark a location of the auxiliary focus apparatus; and when the battery cover is connected to the housing, the auxiliary focus apparatus is disposed opposite to the second identification part.

Optionally, a transparent ink is printed by using silk screen on a location that is on the first side of the glass substrate and that is opposite to the second identification part. The transparent ink is configured to increase light transmittance of a band of lasers that are emitted and received by the auxiliary focus apparatus.

Optionally, the electronic device further includes a collection apparatus, connected to the PCB board and configured to collect a vital sign signal generated when a user touches the first identification part, where when the battery cover is connected to the housing, the collection apparatus is disposed opposite to the first identification part disposed on the battery cover.

In the foregoing solution in the embodiments of the present invention, to implement the photographing effect of the camera assembly, in the embodiments of the present invention, the first through-hole is disposed on only the non-transparent layer disposed on the first side of the glass substrate, and no through-hole opposite to the camera assembly needs to be disposed on the glass substrate. Therefore, when the battery cover is applied to the electronic device, the dust or the liquid can be effectively prevented from entering the electronic device. In addition, because the flatness of the camera region of the glass substrate in the foregoing solution can meet the preset flatness requirement, the image photographed by the camera assembly can be prevented from being deformed. In addition, the film-coated layer is disposed in the camera region of the glass substrate. Because the film-coated layer can meet the light transmittance requirement, the battery cover provided in the embodiments of the present invention can meet the transmittance requirement and the preset flatness requirement without using the camera lens, so as to reduce the overall assembly operation and improve the assembly efficiency. In addition, because no through-hole for installing the camera lens needs to be disposed on the glass substrate, the overall strength of the battery cover is improved.

BRIEF DESCRIPTION OF DRAWINGS

To describe the technical solutions in the embodiments of the present invention more clearly the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

It should be noted that opposite disposition in the embodiments of the present invention should at least ensure that a center of a component A faces a center of another component B.

Figure 1A:
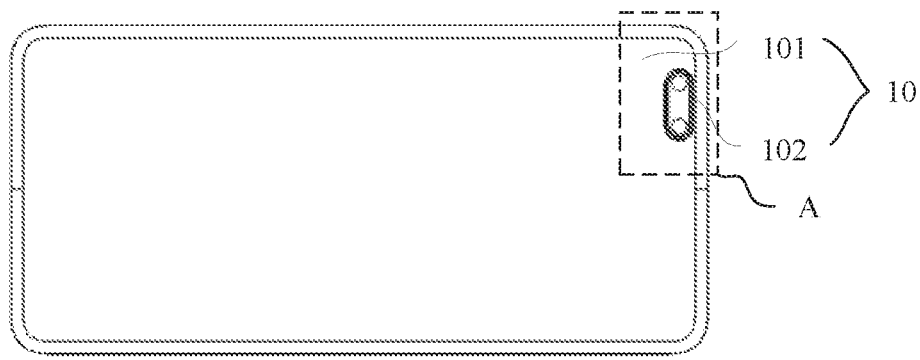
FIG. 1A is a schematic structural diagram of a glass battery cover in the prior art.
Figure 1B:
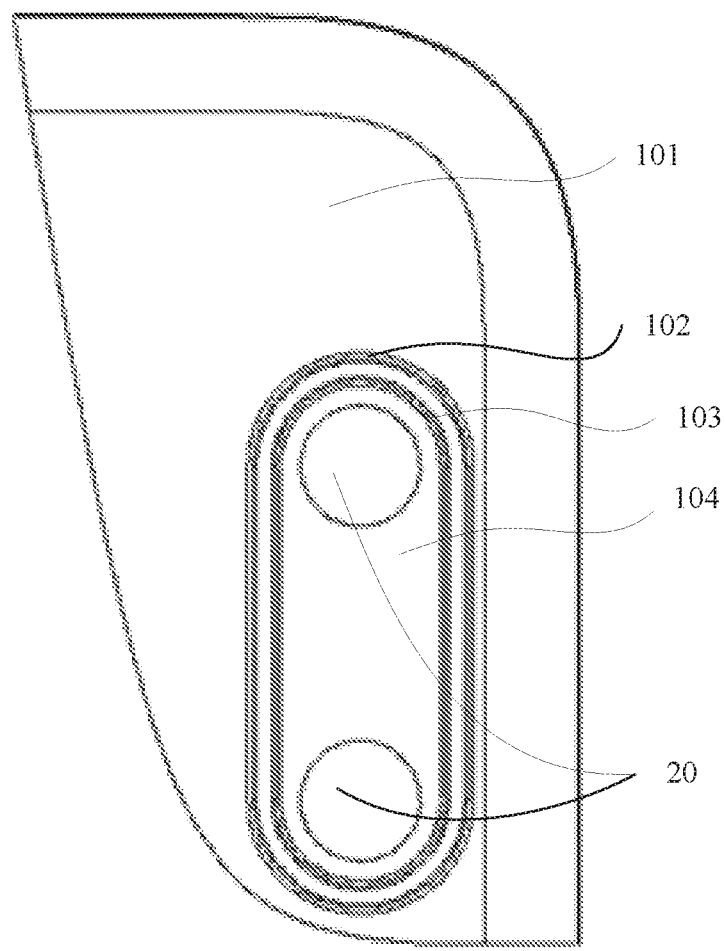
FIG. 1B is an enlarged structural diagram of a region A on the glass battery cover shown in FIG. 1A.
Figure 2A:
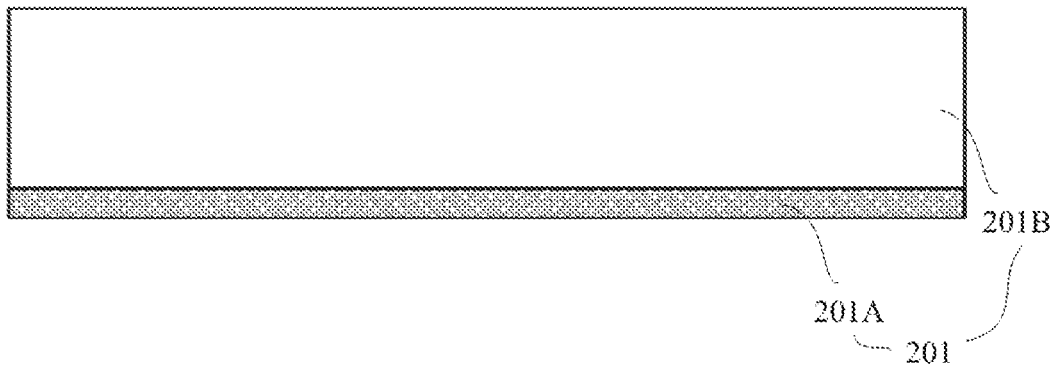
FIG. 2A is a first schematic structural diagram of a battery cover according to an embodiment of the present invention.
Figure 2B:
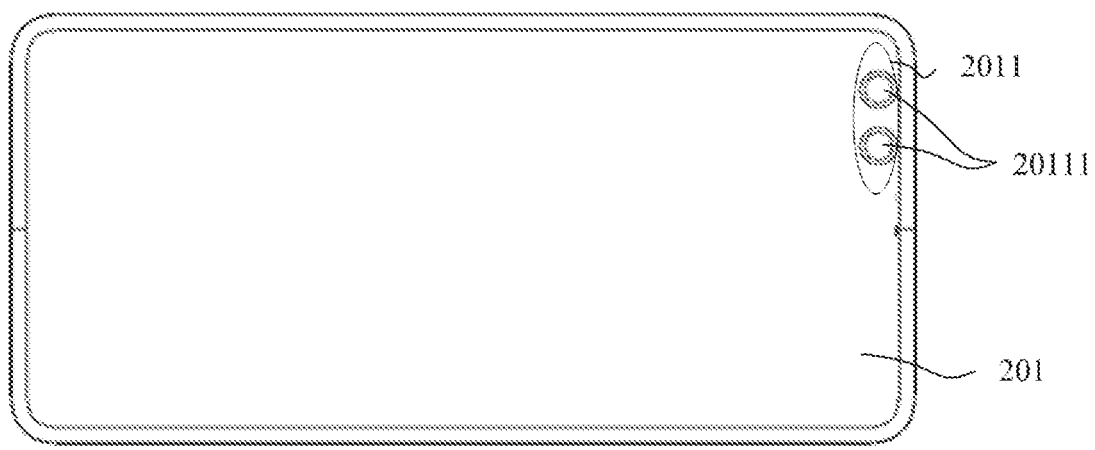
FIG. 2B is a second schematic structural diagram of a battery cover according to an embodiment of the present invention.

As shown in FIG. 2A and FIG. 2B, an embodiment of the present invention provides a battery cover 201, applied to an electronic device and configured to connect a housing of the electronic device. The battery cover 201 includes a glass substrate 201B. A non-transparent layer 201A is disposed on a first side of the glass substrate 201B. At least one first through-hole 20111 is disposed on the non-transparent layer 201A, and the first through-hole 20111 is disposed opposite to a camera assembly disposed in the electronic device.

A camera region 2011 is disposed on the first side of the glass substrate 201B, and the camera region 2011 is disposed opposite to the first through-hole 20111. A film-coated layer for increasing light transmittance is disposed in the camera region 2011 of the glass substrate 201B, and an area of the camera region is greater than or equal to an area of the first through-hole.

The camera region 2011 of the glass substrate 201B is a region in which optical processing is performed on the first side of the glass substrate, and the camera region 2011 needs to meet optical requirements on flatness, light transmittance, and the like.

In the foregoing solution in this embodiment of the present invention, to implement a photographing effect of the camera assembly, in this embodiment of the present invention, the first through-hole is disposed on the non-transparent layer of the first side of the glass substrate, and no through-hole opposite to the camera assembly needs to be disposed on the glass substrate. Therefore, when the battery cover is applied to the electronic device, dust or liquid can be effectively prevented from entering the electronic device. In addition, because flatness of the camera region of the glass substrate in the foregoing solution can meet a preset flatness requirement, an image photographed by the camera assembly can be prevented from being deformed. In addition, the film-coated layer is disposed in the camera region of the glass substrate. Because the film-coated layer can meet a light transmittance requirement, the battery cover provided in this embodiment of the present invention can meet the transmittance requirement and the preset flatness requirement without using a camera lens, so as to reduce an overall assembly operation and improve assembly efficiency. In addition, because no through-hole for installing the camera lens needs to be disposed on the glass substrate, overall strength of the battery cover is improved.

The electronic device in this embodiment of the present invention may be any electronic device that has a camera assembly and a battery cover, and the camera assembly is a rear-facing camera assembly of the electronic device. For example, the electronic device may be a tablet computer, a mobile phone, an MN, or the like.

The glass substrate in this embodiment of the present invention uses a transparent glass substrate.

Optionally, the flatness of the camera region 2011 meets the preset flatness requirement. A grinding process may be used in this embodiment of the present invention, to make the flatness of the camera region meet the preset flatness requirement. The preset flatness is not limited in this embodiment of the present invention, provided that the preset flatness can be used to avoid deformation of an image photographed by the camera assembly. For example, the preset flatness may be 3 micrometers.

Optionally, in this embodiment of the present invention, a second film-coated layer for repelling a fingerprint and an oil stain is disposed on the second side of the glass substrate. The second film-coated layer uses an AF (anti-fingerprint, anti-fingerprint) coated film, so as to effectively repel the fingerprint and easily wipe a generated smudge from the battery cover.

The first side and the second side of the glass substrate 201B are not limited in this embodiment of the present invention. It may be understood that the first side of the glass substrate 201B in this embodiment of the present invention is a side opposite to an internal component of the electronic device. That is, when the battery cover is connected to the electronic device, the non-transparent layer disposed on the first side of the glass substrate 201B is opposite to the internal component of the electronic device.

Optionally, the non-transparent layer in this embodiment of the present invention includes a glare plate or an ink layer that is printed on the first side of the glass substrate by using silk screen. The glare plate may fit the first side of the glass substrate, so as to enhance an appearance effect of the glass substrate, thereby improving appearance gorgeousness of the battery cover.

Specifically, the glare plate 201A in this embodiment of the present invention may fit the first side of the glass substrate 201B by using an OCA (Optically Clear Adhesive) optical clear adhesive. A shape and a size of the glare plate match a shape and a size of the glass substrate 2018.

Figure 2C:
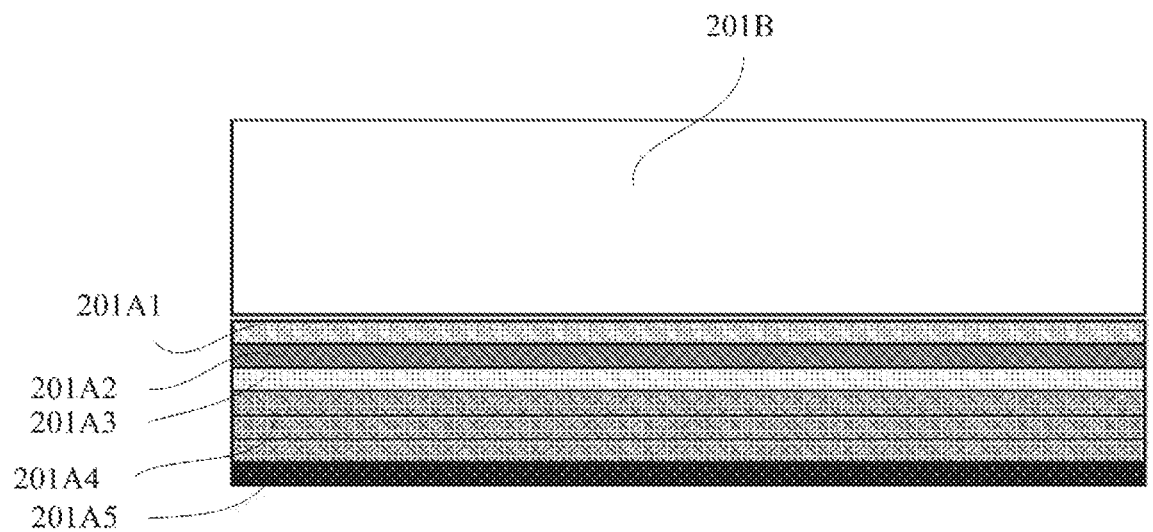
FIG. 2C is a schematic structural diagram of a glare plate according to an embodiment of the present invention.

As shown in FIG. 2C, in this embodiment of the present invention, the glare plate includes an OCA optical clear adhesive 201A1, a PET (polyethylene terephthalate, polyethylene terephthalate) plate 201A2, an NCVM (Nonconductive Vacuum Metallization, nonconductive vacuum metallization) layer 201A3, an ink layer 201A4, and an underlying ink layer 201A5 that are sequentially disposed. The ink layer 201A4 may include at least three layers. For example, three to four ink layers 201A4 may be disposed in this embodiment of the present invention. For example, the glare plate may be obtained in the following manner: UV transfer print and coining processing is performed on the PET plate, the OCA optical clear adhesive is fitted on a side of the PET plate, the ink layer is painted on the other side of the PET plate, and the underlying ink layer is painted beneath the ink layer, so as to obtain the glare plate required in this embodiment of the present invention. When the glare plate is used, a film that fits the OCA optical clear adhesive of the glare plate needs to be torn, to fit the side of the OCA optical clear adhesive of the glare plate on the first side of the glass substrate.

The camera assembly in this embodiment of the present invention includes a camera housing, at least one camera inside the camera housing, and a camera drive circuit connected to the at least one camera. It should be noted that, in this embodiment of the present invention, disposing the first through-hole opposite to the camera assembly indicates that the first through-hole is disposed to face the camera in the camera assembly.

A quantity of first through-holes 20111 is not limited in this embodiment of the present invention, and the quantity of first through-holes 20111 is corresponding to a quantity of cameras in the camera assembly in the electronic device. For example, when the camera assembly in the electronic device includes one camera, one first through-hole 20111 is disposed on the non-transparent layer 201A of the battery cover provided in this embodiment of the present invention; or when the camera assembly in the electronic device includes two cameras, two first through-holes 20111 are disposed on the non-transparent layer of the battery cover 201 provided in this embodiment of the present invention, where one first through-hole 20111 is corresponding to one camera; and so on. Details are not described herein in this embodiment of the present invention.

In this embodiment of the present invention, a shape of the first through-hole 20111 matches a shape of a camera opposite to the first through-hole 20111, and a size of the first through-hole 20111 should be slightly greater than a size of a lens of the camera opposite to the first through-hole 20111, so as to increase a range of an incidence angle at which light passes through the first through-hole and enters the lens of the camera, avoiding a case in which light is blocked because the size of the first through-hole is too small. For example, the size of the first through-hole should at least ensure that the camera in the camera assembly can penetrate and can normally obtain an image through the camera region. The shape of the first through-hole may be a circle, an ellipse, or another shape.

In this embodiment of the present invention, a shape of the camera region may be a shape that matches the first through-hole, for example, a circle, an ellipse, or another shape. A specific shape of the camera region is not limited in this embodiment of the present invention. An area of the camera region is greater than or equal to the area of the first through-hole.

In this embodiment of the present invention, the camera region may include one sub-region or at least two sub-regions. When the camera region includes the at least two sub-regions, a quantity of sub-regions may be set according to the quantity of first through-holes.

For example, when the camera region includes one sub-region, the sub-region may be a region whose shape and area are the same as those of the camera region, or may be a region that is in the camera region, whose area is less than the area of the camera region, and that is disposed opposite to the at least one first through-hole. It may be understood that, a projection of each first through-hole 20111 in the at least one first through-hole onto the camera region of the glass substrate falls within the sub-region. For example, when one first through-hole 20111 is disposed on the glare plate or the ink layer of the battery cover provided in this embodiment of the present invention, the sub-region is disposed opposite to the first through-hole 20111, and a projection of the first through-hole 20111 onto the camera region of the glass substrate falls within the sub-region. When two first through-holes 20111 are disposed on the non-transparent layer of the battery cover provided in this embodiment of the present invention, the sub-region is disposed opposite to the two first through-holes 20111, and projections of the two first through-holes 20111 onto the camera region of the glass substrate are within the sub-region.

Figure 3:
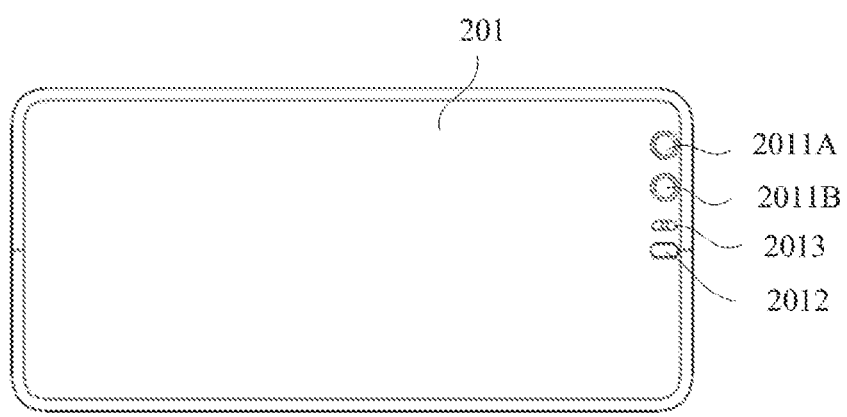
FIG. 3 is a third schematic structural diagram of a battery cover according to an embodiment of the present invention.

When two first through-holes 20111 are disposed on the non-transparent layer 201A of the battery cover provided in this embodiment of the present invention, accordingly, the camera region includes two sub-regions, and each sub-region is corresponding to one first through-hole. A projection of each first through-hole onto the camera region falls within the sub-region disposed opposite to the first through-hole. As shown in FIG. 3, FIG. 3 is a schematic structural diagram of the battery cover when there are two camera assemblies and two first through-holes 20111 are disposed on the glare plate or the ink layer. In FIG. 3, 2011A is a sub-region disposed opposite to a camera, that is, a camera black ring; 2011B is a sub-region disposed opposite to the other camera, that is, a camera black ring of the other camera; and 2011A and 2011B jointly form the camera region.

To reduce light reflection, increase light transmittance, ensure light transmittance of a visible photographing region of the camera, and improve a photographing effect of the camera assembly, a film-coated layer is disposed on the first side of the glass substrate 201B. It may be understood that, the film-coated layer may include a plurality of layers of coated films or a single layer of a coated film, provided that thickness and light transmittance of the film-coated layer meet a requirement. For example, the thickness of the film-coated layer is 230 nm to 250 nm, and is preferably 240 nm.

A shape and an area of the film-coated layer may match the shape and the area of the camera region, that is, the film-coated layer covers the camera region; or a shape and an area of the film-coated layer may match the shape and the area of each sub-region of the camera region, that is, a film-coated layer covers a location opposite to each sub-region, so as to avoid a problem that adhesion of the glare plate 201A or the ink layer 201A to the first side of the glass substrate 201B decreases because the film-coated layer is coated on a large area of the first side of the glass substrate 201B.

For example, the film-coated layer in this embodiment of the present invention uses an anti-reflection (Anti-Reflectance AR) coating (also referred to as an anti-reflective film).

To compensate for ambient light when light is dim, a flash assembly is usually disposed in the electronic device. Because the glass substrate has a light guide function, in one aspect, in this embodiment of the present invention, through-holes may be disposed opposite to the flash assembly and on the glass substrate 201B and the non-transparent layer 201A. Therefore, the flash assembly can penetrate the through-hole disposed opposite to the flash assembly and on the non-transparent layer 201A and the through-hole disposed opposite to the flash assembly and on the glass substrate, and be exposed to the outside, so as to resolve the light crosstalk problem. In another aspect, a through-hole may be disposed opposite to the flash assembly and on the non-transparent layer 201A, and no through-hole is disposed on the glass substrate 201B (that is, the flash assembly does not penetrate the glass substrate), but a flash region is disposed on a surface of the glass substrate 201B to resolve the light crosstalk problem. Because disposing a hole on the glass substrate and disposing no hole on the glass substrate are corresponding to different manners for resolving the light crosstalk problem and structures of battery covers are different, the following provides detailed description with reference to different cases.

It should be noted that, the flash assembly in this embodiment of the present invention includes at least one flash and a flash drive circuit, and disposing the second through-hole 2012 opposite to the flash assembly of the electronic device indicates that the second through-hole 2012 is disposed to face the flash. The at least one flash includes a cool color flash and/or a warm color flash.

For example, in an aspect, in this embodiment of the present invention, the second through-hole 2012 is disposed on the non-transparent layer 201A, the second through-hole 2012 is disposed opposite to the flash assembly of the electronic device, and a through-hole is disposed opposite to the second through-hole 2012 and on the glass substrate 201B.

In this embodiment of the present invention, a shape of the second through-hole may match a shape of a flash in the flash assembly, and a size of the second through-hole may be slightly greater than a size of the flash, so that the flash can penetrate the second through-hole.

In this embodiment of the present invention, a shape of the through-hole disposed on the glass substrate 201B and opposite to the second through-hole 2012 matches the shape of the second through-hole, and a size of the through-hole matches the size of the second through-hole.

Figure 4:
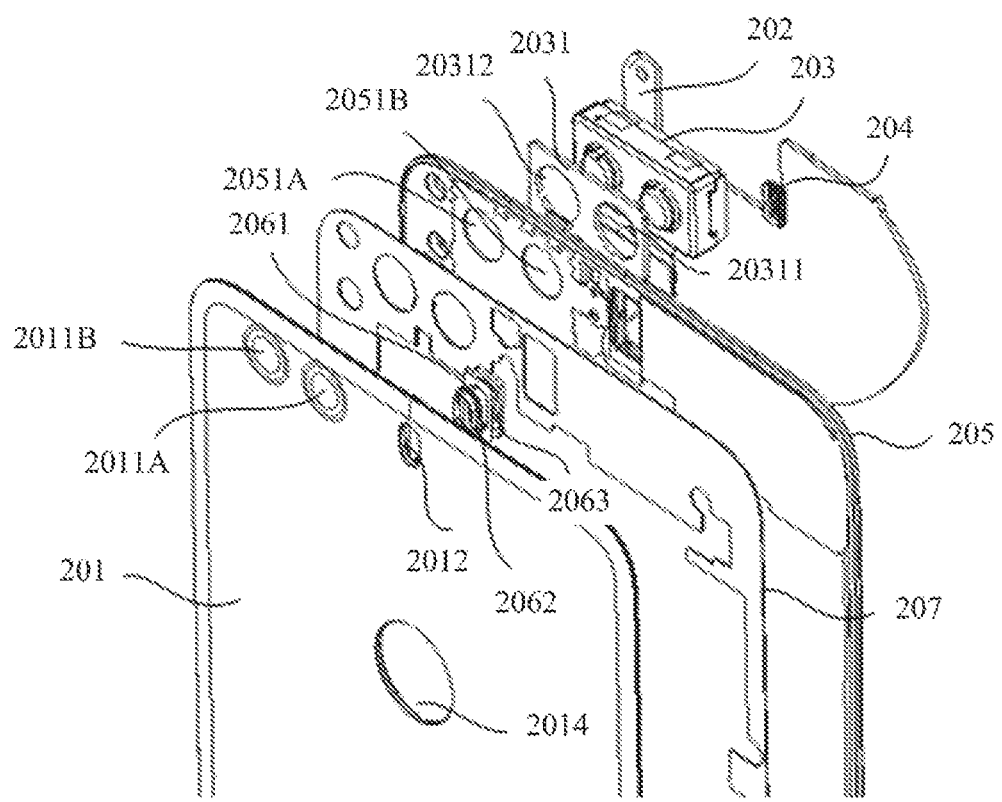
FIG. 4 is a first schematic diagram showing a structure of connecting a battery cover to an electronic device according to an embodiment of the present invention.

To protect the flash, as shown in FIG. 4, a flash protective cover 2063 is disposed, and the flash protective cover is disposed in the second through-hole 2012 and the through-hole that is on the glass substrate 201B and that is opposite to the second through-hole. A specific shape of the flash protective cover 2063 is not limited in this embodiment of the present invention. An accommodation cavity is disposed at one end of the flash protective cover 2063, and configured to accommodate the flash assembly. The other end of the flash protective cover 2063 is configured to be clamped in the second through-hole 2012 and the through-hole that is on the glass substrate 201B and that is opposite to the second through-hole.

Because the glass substrate 201B has the light guide function, to avoid a case in which light sensitivity of the camera assembly is affected because crosstalk of light emitted by the flash assembly, a flash decorating part 2062 is installed between the other end of the flash protective cover 2063 and the second through-hole 2012, and the flash decorating part 2062 is configured to wrap the flash protective cover 2063. Foam is disposed at a bottom of the flash decorating part 2062, and is configured to seal the flash decorating part 2062 and avoid light leakage and liquid entry of the flash assembly. For example, the flash decorating part 2062 uses a metal decorating part.

In another aspect, when no through-hole opposite to the second through-hole 2012 is disposed on the glass substrate 201B, that is, the flash assembly is disposed in the glass substrate 201B and does not penetrate the glass substrate 201B, only a third through-hole is disposed on the non-transparent layer 201A, and the third through-hole is disposed opposite to the flash assembly of the electronic device. A flash region is disposed on the first side of the glass substrate, and the flash region is disposed opposite to the third through-hole. A second film-coated layer is disposed in the flash region, and an area of the flash region is greater than or equal to an area of the third through-hole.

A size and a shape of the third through-hole disposed on the non-transparent layer 201A both match a shape and a size of the flash in the flash assembly. The shape of the flash region disposed on the first side of the glass substrate 201B may be the same as or different from the shape of the third through-hole, and the size of the flash region may be slightly greater than or equal to the size of the third through-hole. For example, when the third through-hole is a circle, the flash region may be an ellipse, and both a diameter of an elliptical long axis and a diameter of an elliptical short axis should be greater than or equal to a diameter of a circle. In this way, size processing and film-coated area requirements of the glass substrate for the flash region may decrease. The second film-coated layer of the flash region uses an anti-reflection film-coated layer. The anti-reflection film-coated layer may include a plurality of layers of anti-reflection coated films, or may be a single layer of an anti-reflection coated film, provided that thickness and light transmittance of the second film-coated layer meet a requirement. For example, the thickness of the second film-coated layer is 230 nm to 250 nm, and is preferably 240 nm.

A shape and an area of the second film-coated layer may match the shape and the area of the flash region, that is, the second film-coated layer covers the flash region, so as to avoid a problem that adhesion of the glare plate 201A or the ink layer 201A to the first side of the glass substrate 201B decreases because the second film-coated layer is coated on a large area of the first side of the glass substrate 201B.

To avoid a case in which a photographing effect of the camera assembly is affected because light crosstalk appears on the surface of the glass substrate 201B when the flash assembly emits light, the flash region on the surface of the glass substrate 201B is processed in this embodiment of the present invention. For example, the flash region is thinner than another location on the glass substrate 201B, that is, a groove whose shape and size match the shape and the size of the flash assembly is disposed in the flash region of the glass substrate 201B, and a black adhesive is disposed around the groove. Herein, the black adhesive usually means all components that can block light, and includes but is not limited to a reflective film coated on a side wall of the groove or a non-transparent material that fits the side wall of the groove, provided that the black adhesive can ensure that light can pass through a location of the flash assembly opposite to the first side of the glass substrate 201B while light cannot pass through a side wall of the groove that wraps the flash assembly, so that the photographing effect of the camera assembly is not affected when the flash normally operates.

As shown in FIG. 4, to prevent dust or liquid from entering the electronic device through the second through-hole 2012, in this embodiment of the present invention, the flash decorating part 2062 is bonded to the flash protective cover 2063 by using a flash adhesive 2061, a through-hole for enabling the flash protective cover 2063 to penetrate is disposed on the flash adhesive 2061, and a size of the flash adhesive 2061 is greater than a size of the flash decorating part 2062.

To improve appearance experience to a user and cover a poor residual adhesive and a cut serration that are caused by hole disposing and edge cutting when the first through-hole is disposed on the non-transparent layer, in this embodiment of the present invention, at least one camera black ring is disposed on the first side or the second side of the glass substrate 201B, and one camera black ring is disposed opposite to the first through-hole.

Optionally, the camera black ring may be obtained by performing, by using an ink, silk screen in a region that is on the first side or the second side of the glass substrate and that is opposite to the first through-hole. It may be understood that, an inner diameter of the camera black ring is less than or equal to a diameter of the first through-hole, so as to resolve a problem of the poor residual adhesive and the cut serration of the non-transparent layer 201A.

Optionally, at least one identification pail is disposed on the first side or the second side of the glass substrate 201B. The identification part is used to mark a location of a component installed inside the electronic device or a signal collection range of a component. The identification part may be disposed, in a silk screen manner, at a location that is on the first side or the second side of the glass substrate 201B and that is opposite to the location of the component inside the electronic device. It may be understood that, the identification part may be an identifier printed on the first side of the glass substrate by using silk screen, and can be seen by the user from the second side of the glass substrate 201B, or the identification part may be an identifier printed on the second side of the glass substrate 201B by using silk screen.

For example, in this embodiment of the present invention, the identification part may be a LOGO or a circle printed on the glass substrate by using silk screen.

The component is not limited in this embodiment of the present invention. For example, the component may be a collection apparatus and/or an auxiliary focus apparatus that is installed inside the electronic device.

Figure 5:
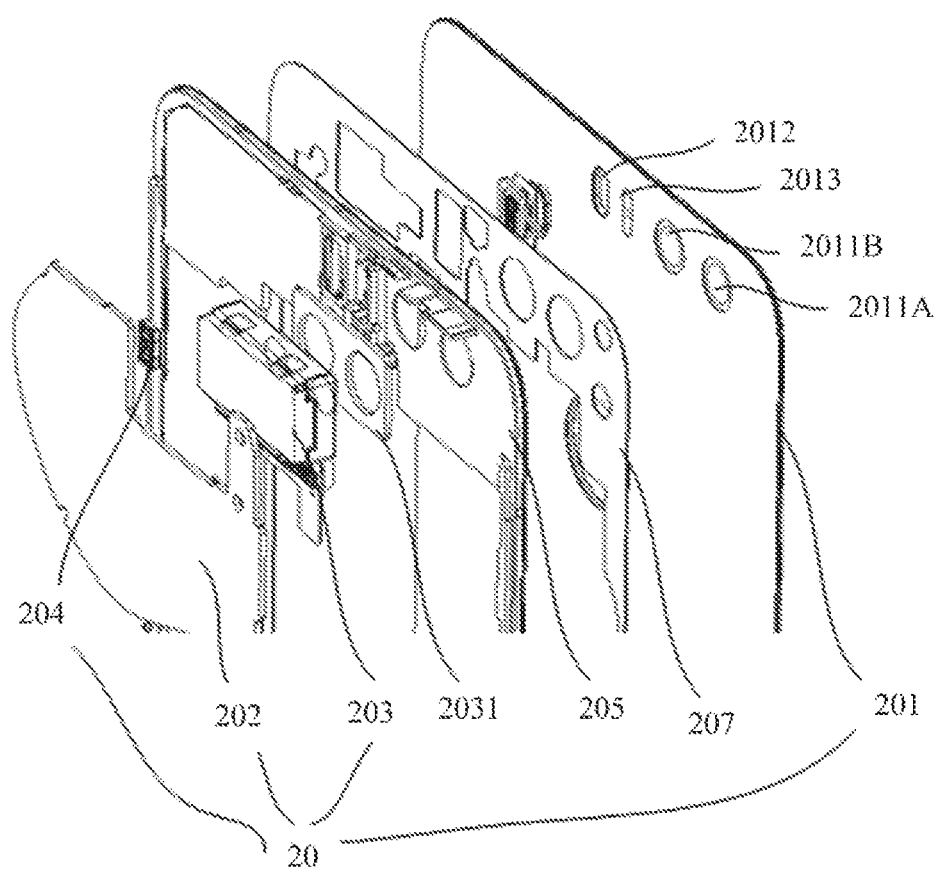
FIG. 5 is a second schematic diagram showing a structure of connecting a battery cover to an electronic device according to an embodiment of the present invention.

For example, when the component is a collection apparatus configured to collect a user vital sign parameter, as shown in FIG. 5, a first identification part 2014 is disposed on the first side or the second side of the glass substrate 201B, and is used to mark a range in which the collection apparatus collects a user vital sign signal.

A third through-hole is disposed on the non-transparent layer 201A. The third through-hole is disposed opposite to the first identification part 2014, and is configured to enable the collection apparatus to be in contact with the first side of the glass substrate through the third through-hole.

Specifically, a shape and a size of the first identification part may be set according to a requirement. For example, as shown in FIG. 4, a ring that is printed on the first side or the second side of the glass substrate 201B by using silk screen. The size of the first identification part may be set according to a detection range of the collection apparatus. Generally, the size of the first identification part may be less than or equal to a maximum detection range of the collection apparatus, but should be greater than or equal to a minimum detection range of the collection apparatus. In this way, when the user touches the first identification part 2014, the collection apparatus may collect the user vital sign signal.

As shown in FIG. 5, an embodiment of the present invention provides an electronic device 20. The electronic device 20 includes a housing, a PCB (Printed circuit board, printed circuit board) 202 disposed in the housing, and a battery cover 201 provided in this embodiment of the present invention. The battery cover 201 is connected to the housing, and a camera assembly 203 connected to the PCB board 202 is disposed in the housing. When the battery cover 201 is connected to the housing, the camera assembly 203 is disposed opposite to a camera region on the battery cover 201, and a non-transparent layer 201A on the battery cover 201 is adjacent to the PCB board 202.

In this embodiment of the present invention, in an aspect, the housing of the electronic device is configured to organize touchscreen modules, that is, a TP (Touch Panel, touch panel) and an LCD (Liquid crystal display, liquid crystal display). In another aspect, the housing of the electronic device is configured to fasten an internal component of the electronic device, for example, the PCB board.

A connection manner of the housing and the battery cover 201 of the electronic device is not limited in this embodiment of the present invention, provided that the connection manner can ensure that the housing of the electronic device is connected to the battery cover 201. For example, the battery cover 201 may be connected to the housing of the electronic device in an integrated manner, or the battery cover 201 may be detachably connected to the housing of the electronic device. For example, an adhesive is pasted around the housing of the electronic device, or a glue is dispensed around the housing of the electronic device, and then the battery cover 201 is fastened at a location at which the adhesive is pasted or a location at which the glue is dispensed. Alternatively, the battery cover 201 may be connected to the housing of the electronic device by using a rear cover. For example, as shown in FIG. 4 or FIG. 5, a battery adhesive 207 is disposed on the rear cover 205 in a circle, then the battery cover 201 is pasted on the battery adhesive 207, and specific pressure is applied to implement press fit, so as to install the battery cover 201 on the rear cover 205 by using the battery adhesive 207. A shape of the battery adhesive 207 should be the same as a shape of the rear cover 205. A plurality of tapped holes are disposed on the rear cover 205, and a tapped hole is disposed, opposite to each tapped hole on the rear cover 205, on the housing of the electronic device. The rear cover 205 may be fastened on and connected to the housing of the electronic device by using a screw, and a through-hole is disposed at a location that is on the rear cover 205 and that is opposite to the internal component of the electronic device. The through-hole may be disposed selectively according to a requirement. For example, a camera through-hole is disposed on the rear cover 205, and the camera through-hole is disposed opposite to the camera assembly 203, and is configured to enable each camera in the camera assembly of the electronic device to be in contact with the battery cover 201 through the through-hole, for example, 2015A and 2015B. When the electronic device has a collection apparatus, a through-hole for enabling the collection apparatus to penetrate should be further disposed on the rear cover 205, the through-hole for enabling the collection apparatus to penetrate is disposed opposite to the collection apparatus, and the collection apparatus can be in contact with the first identification part 2014 through the through-hole. When the electronic device has a flash assembly, a flash through-hole is further disposed opposite to the flash assembly and on the rear cover 205. When the electronic device has an auxiliary focus apparatus 204, an auxiliary focus apparatus through-hole is further disposed opposite to the auxiliary focus apparatus 205 and on the rear cover 205, and the auxiliary focus apparatus may be in contact with, through the auxiliary focus apparatus through-hole, a second identification part disposed on the battery cover 201.

It may be understood that, a through-hole may also be disposed on the battery adhesive 207 according to a requirement.

Figure 6:
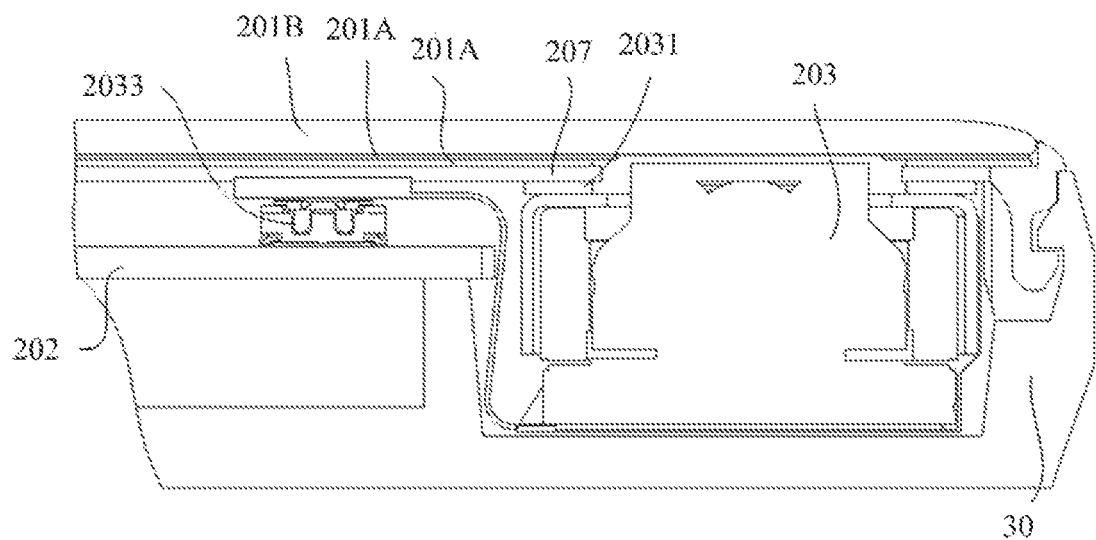
FIG. 6 is a first schematic diagram showing a structure of applying a battery cover to an electronic device according to an embodiment of the present invention.

As shown in FIG. 6, the camera assembly 203 is connected to the PCB board 202 by using a BTB (Board to Board, board to board) connector 2033. Camera sealing foam 2031 is disposed in a region in which the camera assembly 203 is disposed opposite to the battery adhesive 207. The camera sealing foam 2031 is a barrier chip whose size matches a size of the camera assembly 203. A through-hole (a specific quantity of through-holes depends on a quantity of cameras in the camera assembly) is disposed on the camera sealing foam 2031. A location of the through-hole is set to be opposite to that of a camera in the camera assembly 203. In this embodiment of the present invention, the camera sealing foam 2031 and the battery adhesive 207 are used, to implement functions of sealing, dust prevention, liquid proofing, and buffering of the camera assembly 203.

Optionally, the electronic device 20 further includes a flash assembly, connected to the PCB board 202 and configured to compensate for ambient light when light is dim.

When the battery cover 201 is connected to the housing 30, the flash assembly may be built in an accommodation cavity of a flash protective cover 2063 disposed in a second through-hole.

Figure 7:
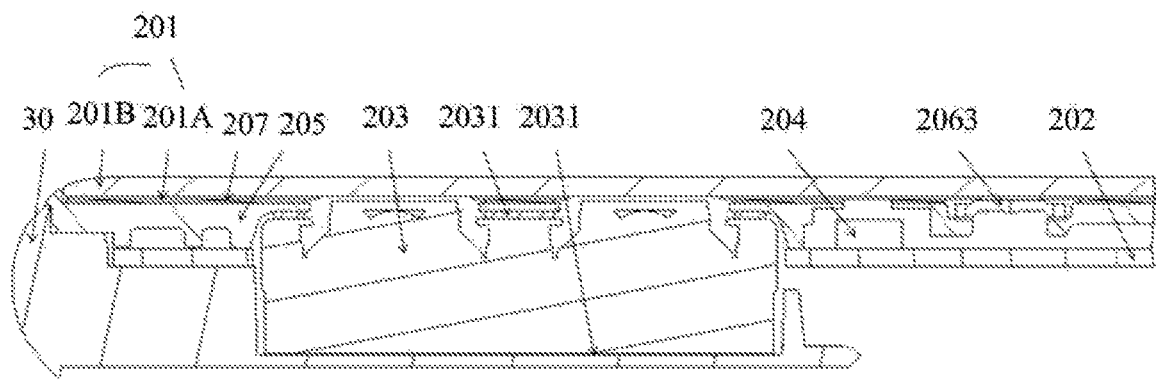
FIG. 7 is a second schematic diagram showing a structure of applying a batter cover to an electronic device according to an embodiment of the present invention.

Optionally, as shown in FIG. 7, the electronic device 20 further includes an auxiliary focus apparatus 204, disposed on the PCB board 202 and configured to measure and identify a distance to a photographed object, so as to implement focus of the camera assembly. When the battery cover 201 is connected to the housing 30, the auxiliary focus apparatus 204 is disposed opposite to the second identification part disposed on the battery cover 201.

The auxiliary focus apparatus 204 uses a laser sensor.

Optionally, to avoid a case in which an appearance of the battery cover is affected because a through-hole is disposed opposite to the laser sensor and on the glass substrate, in this embodiment of the present invention, no laser sensor through-hole is disposed on the glass substrate, the glare plate, or the ink layer. In addition, to ensure that the laser sensor can normally work, in this embodiment of the present invention, a transparent ink (for example, an IR transparent ink) is printed by using silk screen at a location that is on the first side of the glass substrate and that is opposite to the laser sensor. Thickness of the transparent ink is not limited in this embodiment of the present invention, and the transparent ink should be capable of ensuring that a crosstalk value is less than 0.8 mK.

The IR transparent ink can enable a laser with a corresponding wavelength emitted by the laser sensor to penetrate, and shielding light with an unneeded wavelength (for example, blocking other unneeded light in natural light, avoiding interference, and increasing sensitivity of the laser sensor). The IR transparent ink can allow an infrared ray whose wavelength is greater than a wavelength of near infrared (Near Infrared, NIR) light to pass through, and can block visible light and ultraviolet light whose wavelengths are less than the wavelength of the near infrared light. In a range of a near infrared wavelength greater than 850 nm, when the light transmittance reaches approximately 80%, the visible light (400 to 750 nm) and the ultraviolet light (190 to 400 nm) can be blocked.

Optionally, the electronic device 20 further includes a collection apparatus, connected to the PCB board 202 and configured to collect a vital sign signal generated when a user touches the first identification part.

When the battery cover 201B is connected to the housing, the collection apparatus is disposed opposite to the first identification part disposed on the battery cover.

Specifically, the collection apparatus in this embodiment of the present invention may be a fingerprint collection apparatus, and the fingerprint collection apparatus is configured to collect a fingerprint signal generated when the user touches the first identification part, and send the fingerprint signal to the PCB board 202. Then a processor of the electronic device determines, according to the fingerprint signal, whether the fingerprint signal matches a fingerprint signal previously stored by the user. If the fingerprint signal matches the fingerprint signal previously stored by the user, the processor releases a lock status of the electronic device.

It should be noted that, the electronic device may have any one or a combination of the following components: the camera assembly, the flash assembly, the collection apparatus, and the laser sensor. For example, the electronic device may have the camera assembly and the flash assembly, may have only the camera assembly, or may have the camera assembly and the collection apparatus.

Finally, it should be noted that the foregoing embodiments are merely intended for describing the technical solutions of the present invention but not for limiting the present invention. Although the present invention is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A battery cover, configured to couple to a housing of the electronic device, wherein the electronic device comprises a camera assembly, and wherein the battery cover comprises:
   a glass substrate having a first side, wherein the first side comprises a camera region and at least one camera black ring, wherein the camera region comprises a film-coated layer for increasing light transmittance, and wherein the camera black ring is printed using silk screen on the first side; and
   a non-transparent layer being disposed on the first side, wherein the non-transparent layer comprises at least one first through-hole, wherein
   the first through-hole is disposed opposite to the camera assembly disposed in the electronic device, the camera region, and the camera black ring, and wherein an area of the first through-hole is less than or equal to an area of the camera region.

2. The battery cover of claim 1, wherein the non-transparent layer comprises a glare plate.

3. The battery cover of claim 1, wherein the electronic device comprises a flash assembly, wherein the non-transparent layer comprises a second through-hole disposed opposite to the flash assembly of the electronic device, wherein the glass substrate comprises a fifth through-hole, and wherein the fifth through-hole is disposed opposite to the second through-hole.

4. An electronic device, comprising:
   a housing;
   a printed circuit board (PCB) disposed in the housing;
   a battery cover coupled to the housing, wherein the battery cover comprises:
      a glass substrate having a first side, wherein the first side comprises a camera region and at least one camera black ring, wherein the camera region comprises a film-coated layer for increasing light transmittance, and wherein the camera black ring is printed using silk screen on the first side;
      a non-transparent layer being disposed on the first side and adjacent to the PCB when the battery cover is coupled to the housing, wherein the non-transparent layer comprises at least one first through-hole, wherein the first through-hole is disposed opposite to the camera region and the camera black ring, and wherein an area of the first through-hole is less than or equal to an area of the camera region; and
a camera assembly coupled to the PCB and disposed opposite to the camera region and the first through-hole.

5. The electronic device of claim 4, further comprising a flash assembly coupled to the PCB, wherein the battery cover comprises a flash protective cover, wherein the flash protective cover comprises an accommodation cavity, and wherein the flash assembly is disposed in the accommodation cavity when the battery cover is coupled to the housing.

6. The electronic device of claim 4, further comprising an auxiliary focus apparatus disposed on the PCB and configured to measure and identify a distance to a photographed object to implement focus of the camera assembly, wherein the first side or a second side of the glass substrate comprises a second identification marking, wherein the second identification marking marks a location of the auxiliary focus apparatus, and wherein the auxiliary focus apparatus is disposed opposite to the second identification marking when the battery cover is coupled to the housing.

7. The electronic device of claim 6, wherein a portion of the first side opposite to the second identification marking is printed with a transparent ink printed using silk screen.

8. The electronic device of claim 4, wherein the battery cover comprises a first identification marking and the electronic device further comprises a fingerprint collection apparatus coupled to the PCB and configured to collect a vital sign signal generated when a user touches the first identification marking, and wherein the fingerprint collection apparatus is disposed opposite to the first identification marking when the battery cover is coupled to the housing.

9. The electronic device of claim 4, wherein the non-transparent layer comprises a glare plate.

10. The electronic device of claim 4, wherein the non-transparent layer comprises an ink layer printed on the first side using silk screen.

11. The electronic device of claim 4, wherein the electronic device comprises a flash assembly, wherein the non-transparent layer comprises a second through-hole opposite to the flash assembly, wherein the glass substrate comprises a fifth through-hole disposed on the glass substrate opposite to the second through-hole.

12. The electronic device of claim 4, wherein the electronic device comprises a flash assembly, wherein the non-transparent layer opposite comprises a third through-hole disposed opposite to the flash assembly, wherein the first side comprises a flash region disposed opposite to the third through-hole, wherein the flash region comprises a second film-coated layer, and wherein an area of the flash region is greater than or equal to an area of the third through-hole.

13. The electronic device of claim 4, wherein an inner diameter of the camera black ring is less than or equal to a diameter of the first through-hole.

14. The battery cover of claim 1, wherein an inner diameter of the at least one camera black ring is less than or equal to a diameter of the first through-hole.

15. The electronic device of claim 4, wherein the first side comprises at least one identification marking disposed on the first side, and wherein the identification marking marks a location of a component installed inside the electronic device or a signal collection range of the component.

16. The electronic device of claim 15, wherein the component is a fingerprint collection apparatus configured to collect a user vital sign parameter, wherein the first side of the glass substrate comprises a first identification marking that marks a range in which the fingerprint collection apparatus collects a user vital sign signal, wherein the non-transparent layer comprises a fourth through-hole, and wherein the fourth through-hole is disposed opposite to the first identification marking and enables the fingerprint collection apparatus to be in contact with the first side of the glass substrate.

17. The electronic device of claim 4, wherein at least one identification marking is disposed on a second side of the glass substrate, and wherein the identification marking marks a location of a component installed inside the electronic device or a signal collection range of the component.

18. The electronic device of claim 17, wherein the component is a fingerprint collection apparatus configured to collect a user vital sign parameter, and the second side of the glass substrate comprising a first identification marking that marks a range in which the fingerprint collection apparatus collects a user vital sign signal, wherein the non-transparent layer comprises a fourth through-hole, and wherein the fourth through-hole is disposed opposite to the first identification marking and enables the fingerprint collection apparatus to be in contact with the first side of the glass substrate.

19. An electronic device, comprising:
a housing;
a printed circuit board (PCB) disposed in the housing;
a battery cover coupled to the housing, wherein the battery cover comprises:
a glass substrate having a first side and a second side, wherein the first side comprises a camera region, wherein the second side comprises at least one camera black ring, wherein the camera region comprises a film-coated layer for increasing light transmittance, and wherein the camera black ring is printed using silk screen on the second side;
a non-transparent layer disposed on the first side and adjacent to the PCB when the battery cover is coupled to the housing, wherein the non-transparent layer comprises at least one first through-hole, wherein the first through-hole is disposed opposite to the camera region and the camera black ring, and wherein an area of the first through-hole is less than or equal to an area of the camera region; and
a camera assembly coupled to the PCB and disposed opposite to the camera region and the first through-hole.

20. The electronic device of claim 19, wherein an inner diameter of the camera black ring is less than or equal to a diameter of the first through-hole.

* * * * *

UNITED STATES PATENT AND TRADEMARK OFFICE
CERTIFICATE OF CORRECTION

PATENT NO. : 10,904,369 B2
APPLICATION NO. : 16/316242
DATED : January 26, 2021
INVENTOR(S) : Dong Ma et al.

Page 1 of 1

It is certified that error appears in the above-identified patent and that said Letters Patent is hereby corrected as shown below:

In the Claims

Column 15, Line 23, Claim 7, should read as follows:
"The electronic device of claim 6, wherein a portion of the first side opposite to the second identification marking is printed with a transparent ink using silk screen."

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*